(12) United States Patent
Utaki

(10) Patent No.: US 7,204,075 B2
(45) Date of Patent: Apr. 17, 2007

(54) CABLE OR THE LIKE PROTECTION AND GUIDE DEVICE

(75) Inventor: Akihiko Utaki, Osaka (JP)

(73) Assignee: Tsubakimoto Chain Co. (JP)

( * ) Notice: Subject to any disclaimer, the term of this patent is extended or adjusted under 35 U.S.C. 154(b) by 0 days.

(21) Appl. No.: 11/271,551

(22) Filed: Nov. 9, 2005

(65) Prior Publication Data

US 2006/0201840 A1  Sep. 14, 2006

(30) Foreign Application Priority Data

Mar. 11, 2005  (JP) .............................. 2005-068498

(51) Int. Cl.
*F16G 13/00* (2006.01)

(52) U.S. Cl. ........................................ 59/78.1; 248/49

(58) Field of Classification Search ................ 206/389, 206/702; 59/78, 78.1, 900; 248/49, 51
See application file for complete search history.

(56) References Cited

U.S. PATENT DOCUMENTS

| | | | |
|---|---|---|---|
| 4,840,023 A * | 6/1989 | Borsani | 59/78.1 |
| 6,425,238 B1 * | 7/2002 | Blase | 59/78.1 |
| 6,578,350 B2 * | 6/2003 | Blase et al. | 59/78.1 |
| 6,708,480 B1 * | 3/2004 | Wehler | 59/78.1 |
| 6,725,642 B2 * | 4/2004 | Tsutsumi et al. | 59/78.1 |
| 6,745,555 B2 * | 6/2004 | Hermey et al. | 59/78.1 |
| 6,984,782 B2 * | 1/2006 | Ikeda et al. | 59/78.1 |

FOREIGN PATENT DOCUMENTS

| | | |
|---|---|---|
| JP | 2003-299238 | 10/2003 |
| JP | 2004-527706 | 9/2004 |

OTHER PUBLICATIONS

U.S. Appl. No. 11/499,328, Tsubakimoto.

* cited by examiner

*Primary Examiner*—Luan K. Bui
(74) *Attorney, Agent, or Firm*—Woodling, Krost & Rust

(57) ABSTRACT

A cable or the like protection and guide device is provided in which inadvertent disconnection in a coupling portion of a side plate due to the repetition of flexional movement is avoided. A load, which is liable to occur in a flexion portion during restriction of flexional movements, is avoided, whereby excellent endurance can be obtained. Maintenance at the coupling of the side plates is easy. A cable or the like protection and guide device (100) is disclosed in which right and left spaced side plates (110, 110) are each integrally formed by a front side plate portion (111) connected to a precedent side plate (110), a rear side plate portion (111) connected to a subsequent side plate (110') and a flexible coupling portion (113) intervened between said front side plate portion (111) and said rear side plate portion (112). Snap-fit mechanisms Sa and Sb, which connect the side plates to each other are provided between a rear side plate portion (112) of the precedent side plate (110) and a front side plate portion (111') of a side plate (110) subsequently connected to the rear side plate portion (112).

4 Claims, 12 Drawing Sheets

CABLE OR THE LIKE PROTECTION AND GUIDE DEVICE

This application claims priority to Japanese Patent Application No. 2005-068498 filed Mar. 11, 2005.

TECHNICAL FIELD

The present invention relates to a cable or the like protection and guide device, and more specifically relates to a cable or the like protection and guide device suitable for accommodating a cable or the like such as a cable (cables), a hose (hoses) or the like, which supplies a movable member of an industrial machine with electric power or energy of compressed air and safely, reliably guiding and protecting a cable (cables) or the like even during the movable portion.

BACKGROUND TECHNOLOGY

As conventional cable or the like protection and guide devices, an energy guide chain, which connects side plates to each other with a different coupling element from the side plate, is known (see for example Patent Reference 1).

Further, as conventional cable or the like protection and guide devices, a cable or the like protection and guide device, which connects side plates to each other by fitting a connecting rod integrally formed on each side plate to a connecting groove between side plates, is also known (see for example Patent Reference 1).

Patent Reference 1 is Japanese Patent Indication No. 2004-527706.

Patent Reference 2 is Japanese Laid-Open Patent Publication No. 2003-299238.

Problems to be Solved by the Invention

However, in such an energy guide chain as in the Patent Reference 1, since a side plate and a coupling element are separately formed, there was a problem that a significant load of manufacturing parts and a significant load of operating assembly are required.

Further, in such energy guide chain as in the Patent Reference 1, since a side plate and a coupling element are separately formed, there was a troublesome problem in maintenance that mutual coupling of side plates take much time and effort.

Further, in the energy guide chain as in the Patent Reference 1, since side plates are connected to each other by fitting a different element from the side plates between the side plates, there was a problem that displacements are gradually generated between a side plate and a connecting member by repetitions of flexional movements between links and the chain is decomposed by disconnection of such a side plate at a coupling portion whereby breakage is liable to occur.

On the other hand, in the cable or the like protection and guide device as in the Patent Reference 2, since a connecting rod formed in a protruding manner outside a side edge of a side plate also serves a flexion portion for flexibly connecting link bodies to each other and the connecting rod has a configuration in which the rod supports a load on a side plate during restriction of mutual flexion of connecting side plates, there was a possibility the connecting rod is broken so that a service life of the guide device is shortened. That is in the protection and guide device of the Patent Reference 2, there was a problem that a flexion portion composed of a connecting rod is broken by a load given at the time of the restriction of flexion so that a service life of the guide device is shortened.

Further, in the protection and guide device of Patent Reference 2, since the side plates are connected to each other by fitting a connecting rod between the side plates into a connecting groove, there was a problem that displacements are gradually generated between the connecting rod between the side plates and the connecting groove by repetitions of flexional movements between link bodies and the guide device is decomposed by disconnection of such a side plate at a coupling portion whereby breakage is liable to occur.

Accordingly, the object of the present invention is to solve the above-mentioned problems or to provide a cable or the like protection and guide device, in which inadvertent disconnection in a coupling portion of a side plate due to the repetition of flexional movement sis avoided, and a load, which is liable to occur in a flexion portion during restriction of flexional movements, is avoided, whereby excellent endurance can be exerted, and in which a load of manufacturing parts and a load of assembly operation can be reduced and maintenance at the coupling of side plates is easy.

Means for Solving the Problems

The invention according to claim 1 attains the above-mentioned object by a cable or the like protection and guide device in which a number of right and left pair of spaced side plates are connected to each other in a longitudinal direction and connecting arms are bridged over flexion inner circumferential sides and flexion outer circumferential sides of said side plates with predetermined intervals, so that a cable or the like is accommodated in a cable accommodating space along the longitudinal direction, formed by being surrounded by said side plates and said connecting arms, characterized in that said side plate is integrally formed by a front side plate portion connected to a precedent side plate, a rear side plate portion connected to a subsequent side plate and a flexible coupling portion intervened between said front side plate portion and said rear side plate portion, and that a snap-fit mechanism, which causes said side plates to engage each other to connect them, is provided between a rear side plate portion of the precedent side plate and a front side plate portion of a side plate subsequently connected to said rear side plate portion.

The invention according to claim 2 attains the above-mentioned object by, in addition to the configuration of claim 1, a cable or the like protection and guide device according to claim 1, characterized in that a linear position holding surface, which holds a linear connection state of said side plate, is formed on a flexion outer circumferential side portion than a coupling portion of the side plate and a flexed position restricting surface, which restricts the flexed connection state of said side plate, is formed on a flexion inner circumferential side portion than a coupling portion of the side plate.

The invention according to claim 3 attains the above-mentioned object by, in addition to the configuration of claim 1, a cable or the like protection and guide device according to claim 1, characterized in that a linear position holding surface, which holds a linear connection state of said side plate, is respectively formed on a flexion outer circumferential side portion than a coupling portion in a front side plate portion of adjacent side plates and a flexion inner circumferential side portion than a coupling portion in a rear side plate portion of adjacent side plates, and a flexed position restricting surface, which restricts the flexed connection state of said side plate, is respectively formed on a flexion outer circumferential side portion than a coupling portion in a front side plate of adjacent side plates, and a flexion inner circumferential side portion than a coupling portion in a rear side plate of adjacent side plates.

Effects of the Invention

According to the cable or the like protection and guide device of the invention of claim 1, since a number of right and left pair of spaced side plates are connected to each other in a longitudinal direction and connecting arms are bridged over flexion inner circumferential sides and flexion outer circumferential sides of the side plates with predetermined intervals, a cable (cables) or the like can be accommodated in a cable accommodating space surrounded by side plates and connecting arms along the longitudinal direction of the device. Additionally the following peculiar effects can be obtained.

That is since said side plate is integrally formed by a front side plate portion connected to a precedent side plate, a rear side plate portion connected to a subsequent side plate and a coupling portion intervened between said front side plate portion and said rear side plate portion, the load of manufacturing parts and the load of assembly operation can be reduced without increasing a parts count and an inadvertent disconnection of the side plate at a coupling portion, which is liable to occur by repetition of flexional movements can be avoided.

And since an engaged snap-fit mechanism is provided between a rear side plate portion of the precedent side plate and a front side plate portion of a side plate subsequently connected to the rear side plate portion, the adjacent side plates become detachable each other through the snap-fit mechanism. Thus, the maintenance during coupling and decoupling the side plates can be easily attained.

According to the cable or the like protection and guide device of the invention of claim 2, in addition to the effects obtained by the cable or the like protection and guide device of claim 1, since a linear position holding surface, which holds a linear connection state of said side plate, is formed on a flexion outer circumferential side portion than a coupling portion of the side plate and a flexed position restricting surface, which restricts the flexed connection state of said side plate, is formed on a flexion inner circumferential side portion than a coupling portion of the side plate, a load which is liable to occur at a coupling portion, which becomes a flexible portion during restriction of a flexed position, is avoided so that excellent endurance can be exhibited and a linear connection state and flexed connection state can be reliably maintained.

According to the cable or the like protection and guide device of the invention of claim 2, in addition to the effects obtained by the cable or the like protection and guide device of claim 1, since a linear position holding surface, which holds a linear connection state of said side plate, is respectively formed on a flexion outer circumferential side portion than a coupling portion in a front side plate portion of adjacent side plates and a flexion inner circumferential side portion than a coupling portion in a rear side plate portion of adjacent side plates, and a flexed position restricting surface, which restricts the flexed connection state of said side plate, is respectively formed on a flexion outer circumferential side portion than a coupling portion in a front side plate of adjacent side plates, and a flexion inner circumferential side portion than a coupling portion in a rear side plate of adjacent side plates, a load which is liable to occur at a coupling portion, which becomes a flexible portion during restriction of a flexed position, is avoided so that excellent endurance can be exhibited. And since a surface contact load between side plates, which occur during the flexed positional restriction and the linear positional retention, is divided into two parts that is a flexion outer circumferential side and a flexion inner circumferential side, the linear connection state and flexed connection state can be reliably maintained.

If a cable or the like protection and guide device according to the present invention avoids inadvertent disconnection of a side plate due to repetition of flexional movements and avoids a load, which is liable to occur at a flexed portion during flexional restriction so that excellent endurance is exhibited, and if the cable or the like protection and guide device reduces a load of manufacturing parts and a load of an assembly operation so that the maintenance during coupling and decoupling of the side plate can be easily attained, by the configurations that a number of right and left pair of spaced side plates are connected to each other in a longitudinal direction and connecting arms are bridged over flexion inner circumferential sides and flexion outer circumferential sides of said side plates with predetermined intervals, and that said side plate is integrally formed by a front side plate portion connected to a precedent side plate, a rear side plate portion connected to a subsequent side plate and a flexible coupling portion intervened between said front side plate portion and said rear side plate portion, and a snap-fit mechanism, which causes said side plates to engage each other to connect them, is provided between a rear side plate portion of the precedent side plate and a front side plate portion of a side plate subsequently connected to said rear side plate portion, so that a cable or the like is accommodated in a cable accommodating space along the longitudinal direction, formed by being surrounded by said side plates and said connecting arms, any concrete embodiments may be used.

That is, if the side plate used in the cable or the like protection and guide device of the present invention is a resin, which can form a snap-fit mechanism, which can ensure a flexible coupling portion and predetermined engagement strength, it may be molded of any engineering plastic resins. For example, polyamide 6 resin, polyamide 12 resin, polyamide 46 resin, polyamide 66 resin, acryl resin, polyacetal resin and the like may be preferably adopted.

And if a concrete form of the snap-fit mechanism provided between a rear side plate portion of the precedent side plate and a front side plate portion of a side plate subsequently connected to the rear side plate portion is for example a mutually concave-convex engagement member formed by an engagement protrusion or a hole to be engaged disposed on a front end surface or a side surface in a front side plate portion of the side plate and a portion to be engaged or an engagement protrusion disposed on a rear end surface or a side surface in a rear side plate portion of the side plate opposed to the former engagement protrusion or the hole to be engaged, or the like, any snap-fit forms may be used.

Further if the linear position holding surface and the flexed position restriction surface formed in the cable or the like protection and guide device of the present invention are provided on a flexion outer circumferential side portion or a flexion inner circumferential side portion of the side plate except for a coupling portion thereof, any portions may be used. For example, an end surface or a side surface of the side plate may be adopted.

A better understanding will be had when reference is made to the Description Of The Invention and Claims which follow hereinbelow.

DESCRIPTION OF THE INVENTION

EXAMPLE 1

First, a cable or the like protection and guide device 100, which is a first example of the present invention, will be described with reference to FIGS. 1 and 2. Here, FIG. 1 is a perspective view showing a flexed state of the cable or the like protection and guide device 100, and FIG. 2 is a perspective view of side plates used in the cable or the like protection and guide device 100.

The cable or the like protection and guide device 100, which is a first example of the present invention, is used for protecting and guiding cables or the like C such as electric cables, which connect between a movable portion and a stationary portion in a semiconductor device, an explosive charge testing device, a door opening/closing device for a vehicle or the like to carry out transmission and supply of electric signals, and hoses, which supply pressure liquid or pressure gas, and is longitudinally connected to connect between the movable portion and the stationary portion (not shown), and further the device 100 can exhibit a linear position or a flexed position in accordance with relatively remote movement conditions between the movable portion and the stationary portion. As shown in FIG. 1, the cable or the like protection and guide device 100 is formed in such a manner that a number of right and left pair of spaced side plates 110, 110 are connected to each other in a longitudinal direction and connecting arms 120 are bridged over flexion inner circumferential sides and flexion outer circumferential sides of the side plates 110, 110 with predetermined intervals, so that a cable (cables) or the like C is accommodated in a cable accommodating space with a rectangular section along the longitudinal direction, formed by being surrounded by these right and left pair of side plates 110, 110 and these connecting arms 120, 120 arranged on upper and lower positions in a bridged manner over the flexion inner circumferential side and the flexion outer circumferential side, respectively.

Figure 1:
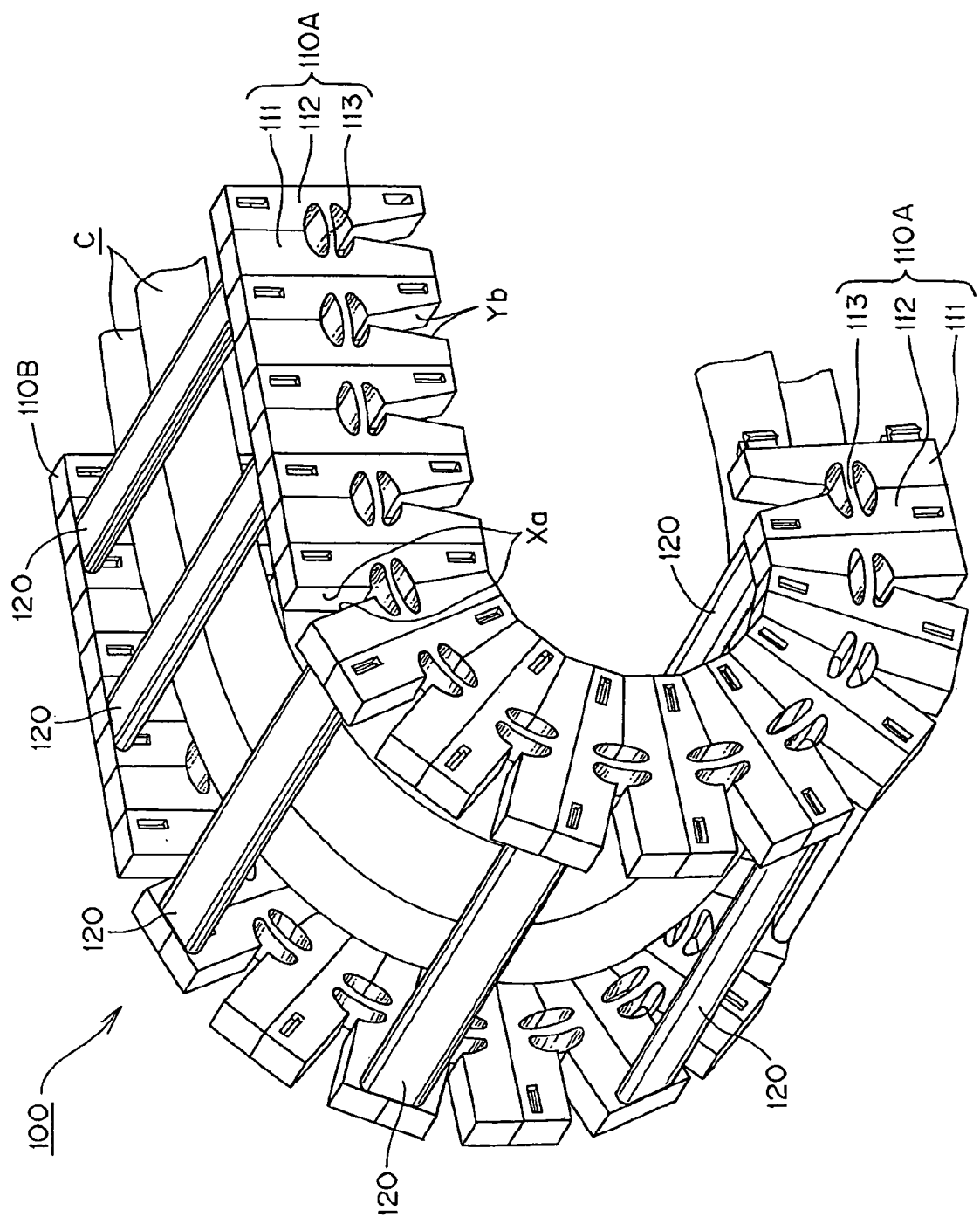
FIG. 1 is a perspective view showing a flexed state of a cable or the like protection and guide device, which is a first example according to the present invention.
Figure 2:
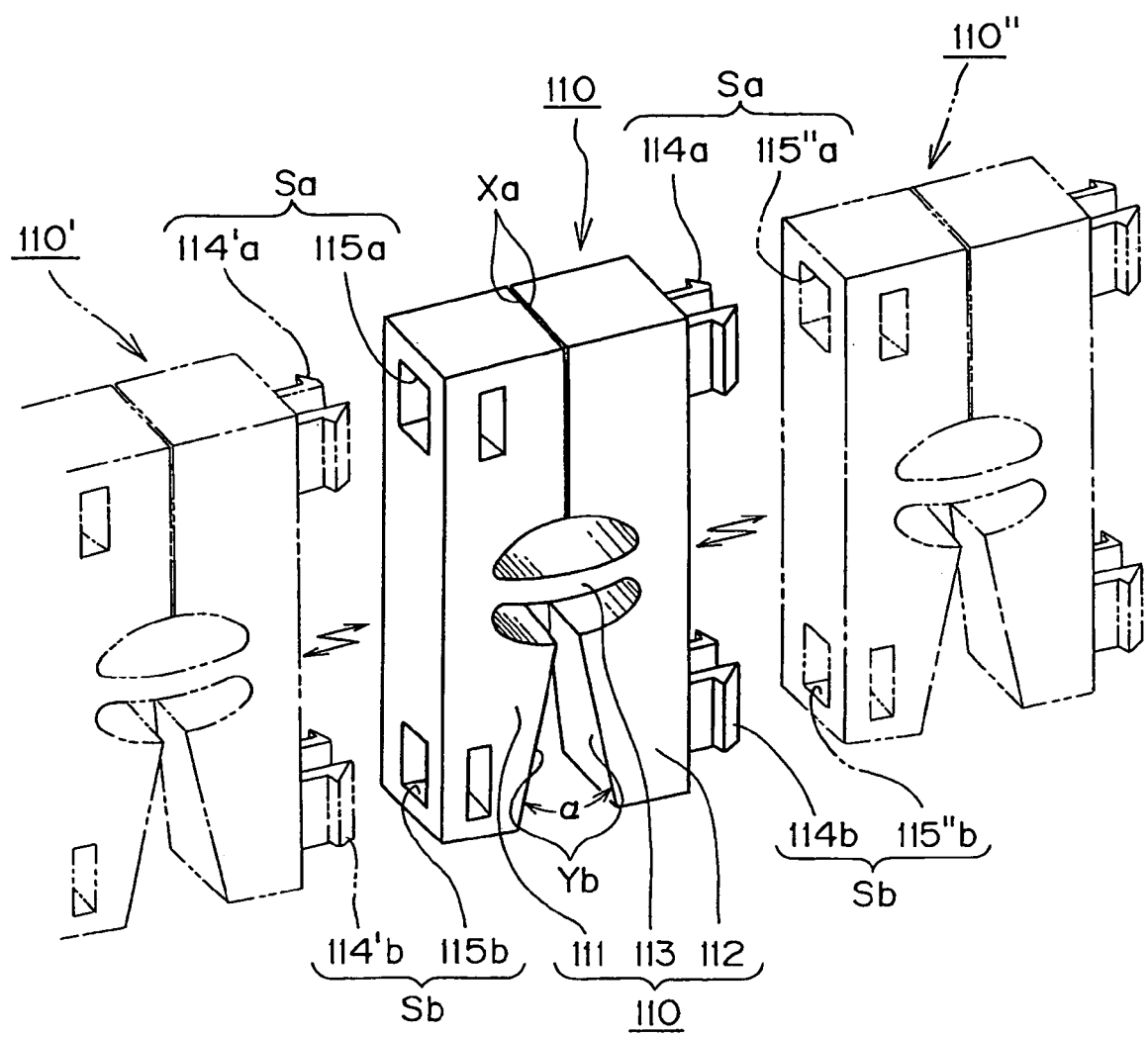
FIG. 2 is a perspective view of a side plate used in a cable or the like protection and guide device 100.

It is noted that in FIG. 1, the above-mentioned movable portion and stationary portion are not shown.

And the side plates 110 used in the first example are molded using a polyamide resin and have the same shape in both right and left spaced side plates. The side plate 110 is integrally formed as shown in FIG. 2 by a front side plate 111 connected to a precedent side plate 110', a rear side plate portion 112 connected to a subsequent side plate 110" and a flexible coupling portion 113 intervened between said front side plate portion 111 and said rear side plate portion 112.

Further, between the rear side plate portion 112' of the precedent side plate 110' and a front side plate portion 111 of a side plate 110 subsequently connected to the rear side plate portion 112' are respectively provided a flexion outer circumferential side snap-fit mechanism Sa and flexion inner circumferential side snap-fit mechanism Sb, respectively connected to each other. Then side plates 110, which are adjacent through these snap-fit mechanisms Sa and Sb, are detachable from each other and maintenance during the decoupling and coupling of the side plate can be easily attained.

It is noted that in the first example, the snap-fit mechanisms Sa and Sb adopted on the flexion outer circumferential side and the flexion inner circumferential side are respectively comprised of engagement protrusions 114a, 114b consisting of hook-shaped engagement pawls and window-shaped holes 115a, 115b to be engaged, which detachably engage the engagement protrusions 114a, 114b.

Further, between a rear end of the front side plate portion 111 and a front end of the rear side plate portion 112, positioned on a flexion outer circumferential side than the coupling portion 113, are respectively formed linear position holding surfaces Xa, and between a rear end of the front side plate portion 111 and a front end of the rear side plate portion 112, positioned flexion inner circumferential side than the coupling portion 113, are respectively formed flexed position restriction surfaces Yb. Then while the flexion inner circumferential side flexed position restriction surfaces Yb are opened during linear position holding as shown in FIG. 1, the flexion outer circumferential side linear position holding surfaces Xa are brought into contact with each other so that a linear position can be reliably maintained without applying a load to the coupling portion 113. Further, while the flexion outer circumferential side linear position holding surfaces Xa are opened during flexed position restriction as shown in FIG. 1, the flexion inner circumferential side flexed position restriction surfaces Yb are brought into contact with each other so that a flexed position can be reliably maintained without applying a load to the coupling portion 113.

It is noted that the maximum opening angle α between the flexed position restriction surfaces Yb in the first example can be determined in accordance with the number of the side plates 110 forming a flexed position and the flexional radius.

Further, the coupling portion 113 in the first example is integrally molded of a polyamide resin, which is the same material as those of the front side plate portion 111 and the rear side plate portion 112, forming the side plate 110. However, in order to enhance the rigidity of the front side plate portion 111 and the rear side plate portion 112 forming the side plate 110, side plates 110 may be molded using a two-color molding process such that only the front side plate portion 111 and the rear side plate portion 112, forming the side plate 110, are made of a different high strength resin. Alternatively, in order to enhance the flexion strength of the coupling portion 113 a wire may be buried into only the coupling portion 113 by an insert molding process.

Further, if a concrete mount form of the connecting arm 120 is a mount form, in which the connecting arms are bridged over the flexion inner circumferential side and flexion outer circumferential side of the right and left pair of spaced side plates 110, 110 so that a cable accommodating space with a rectangular section can be formed, any concrete forms may be used. For example, any one of a mount form of the connecting arm 120 on right and left pair of spaced side plates 110, 110 by adhesion, a mount form by concave-convex fitting, a mount form by a one side hinge and the like may be adopted. However, when maintenance of a cable (cables) or like C accommodated in the cable accommodating space is performed, an openable/closable mount form of the connecting arm 120 is preferred.

It is noted that although, in the case of the first example, the connecting arms 120 are bridged over a number of connected side plates 110 in alternate their arrangement intervals of the side plates 110, the connecting arms 120 may be bridged over the side plates 110 in 1:1 accordance with respect to each side plate 110.

Since the side plate is integrally formed by a front side plate portion 111, a rear side plate portion 112 and a flexible coupling portion 113, the thus obtained cable or the like protection and guide device 100 can reduce a load of manufacturing parts and a load of an assembly operation without increasing a parts count, and can avoid an inadvertent disconnection at the coupling portion 113, which is liable to occur due to repetition of flexing movements. Further, since adjacent side plates 110, 110 becomes detachable through two-sets of snap-fit mechanisms Sa and Sb respectively provided on the flexion outer circumferential side and the flexion inner circumferential side, the device 100 easily can attain maintenance during decoupling and coupling of the side plates 110, 110, and reliably maintains the linear position and the flexed position are reliably maintained so that a load, which is liable to occur at a coupling portion 113, which becomes a flexed portion during flexed position restriction, is avoided and excellent endurance can be exhibited. Thus the effects of the cable or the like protection and guide device 100 of the first example are very large.

EXAMPLE 2

Figure 5:
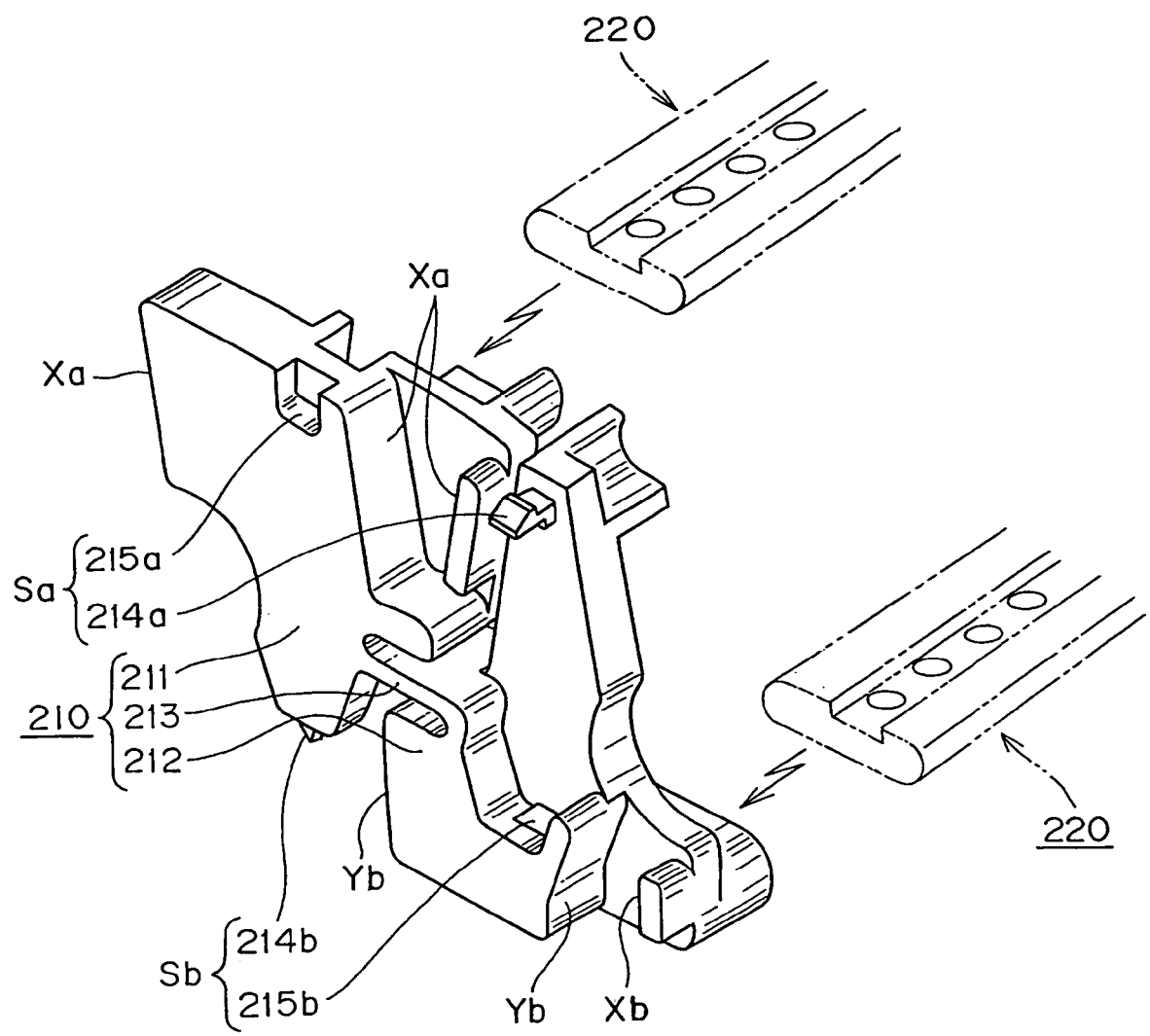
FIG. 5 is a perspective view of the side plate viewed from a direction B in FIG. 4.
Figure 6:
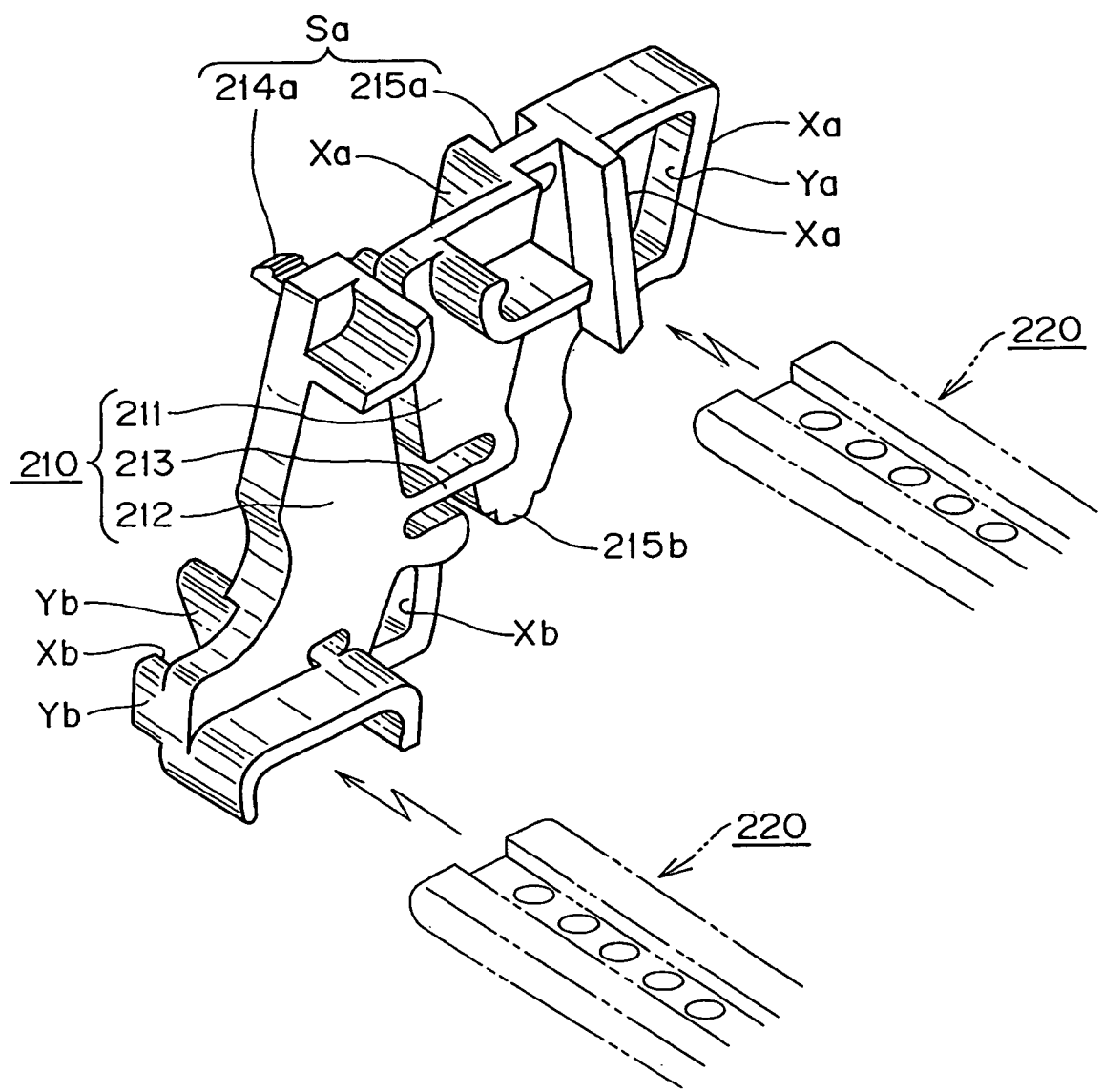
FIG. 6 is a perspective view of the side plate viewed from a direction C in FIG. 4.
Figure 7:
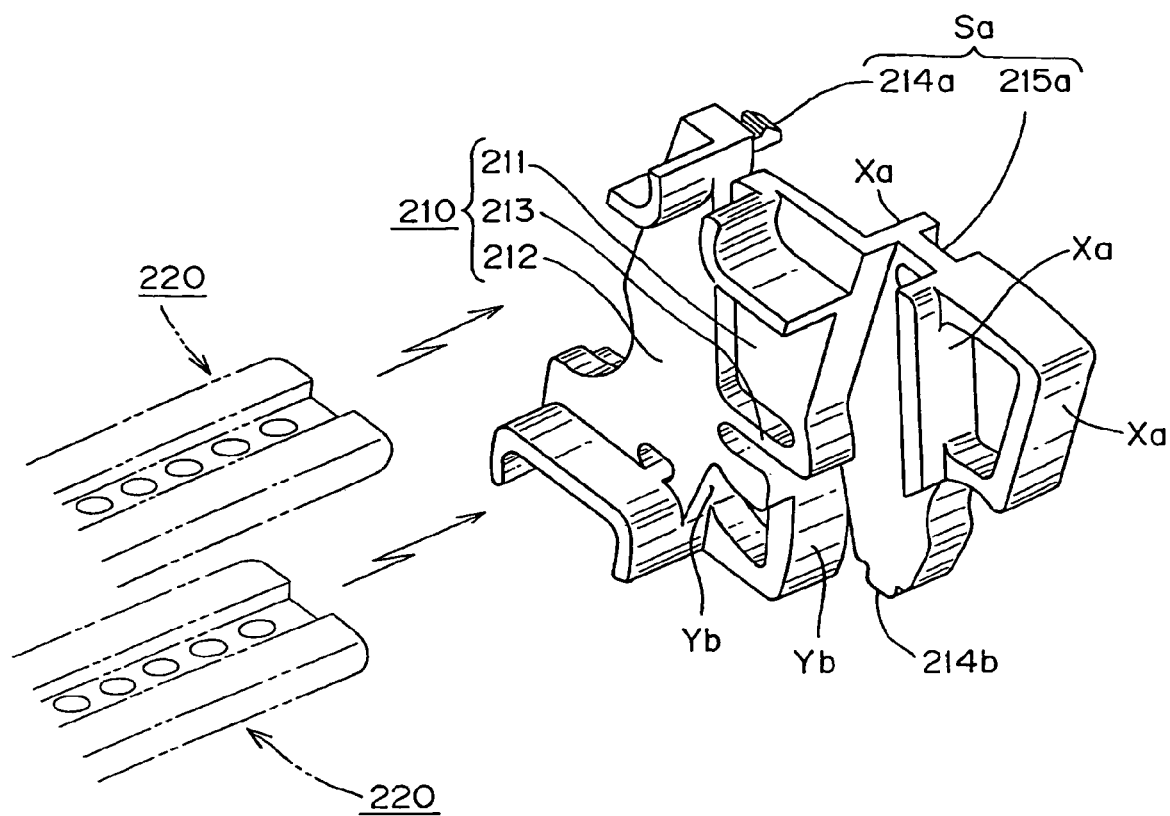
FIG. 7 is a perspective view of the side plate viewed from a direction D in FIG. 4.

A cable or the like protection and guide device 200, which is a second example of the present invention, will be described below with reference to FIGS. 3 to 7. Here, FIG. 3 is a perspective view showing a flexed state of the cable or the like protection and guide device 200, FIGS. 4 to 7 are perspective views of a side plate used in the cable or the like protection and guide device 200, and particularly FIG. 4 is a perspective view of the side plate shown by an arrow A in FIG. 3, FIG. 5 is a perspective view of the side plate viewed from a direction B in FIG. 4, FIG. 6 is a perspective view of the side plate viewed from a direction C in FIG. 4 and FIG. 7 is a perspective view of the side plate viewed from a direction D in FIG. 4.

The cable or the like protection and guide device 200, which is a second example of the present invention, is used, as in the above-mentioned cable or the like protection and guide device 100 of the first example, for protecting and guiding cables or the like C such as electric cables, which connect between a movable portion and a stationary portion in a semiconductor device, an explosive charge testing device, a door opening/closing device for a vehicle or the like to carry out transmission and supply of electric signals, and hoses, which supply pressure liquid or pressure gas, and is longitudinally connected to connect between the movable portion and the stationary portion (not shown), and further the device 200 can exhibit a linear position or a flexed position in accordance with relatively remote movement conditions between the movable portion and the stationary portion. As shown in FIG. 3, the cable or the like protection and guide device 200 is formed in such a manner that a number of right and left pair of spaced side plates 210A, 210B are connected to each other in a longitudinal direction and connecting arms 220 are bridged over flexion inner circumferential sides and flexion outer circumferential sides of these side plates 210A, 210B in alternate arrangement intervals of the side plates 210A, 210B, so that a cable (cables) or the like C is accommodated in a cable accommodating space with a rectangular section along the longitudinal direction, formed by being surrounded by these right and left pair of side plates 210A, 210B and these connecting arms 220, 220 arranged in a bridged manner over the flexion inner circumferential side and the flexion outer circumferential side, respectively.

Figure 3:
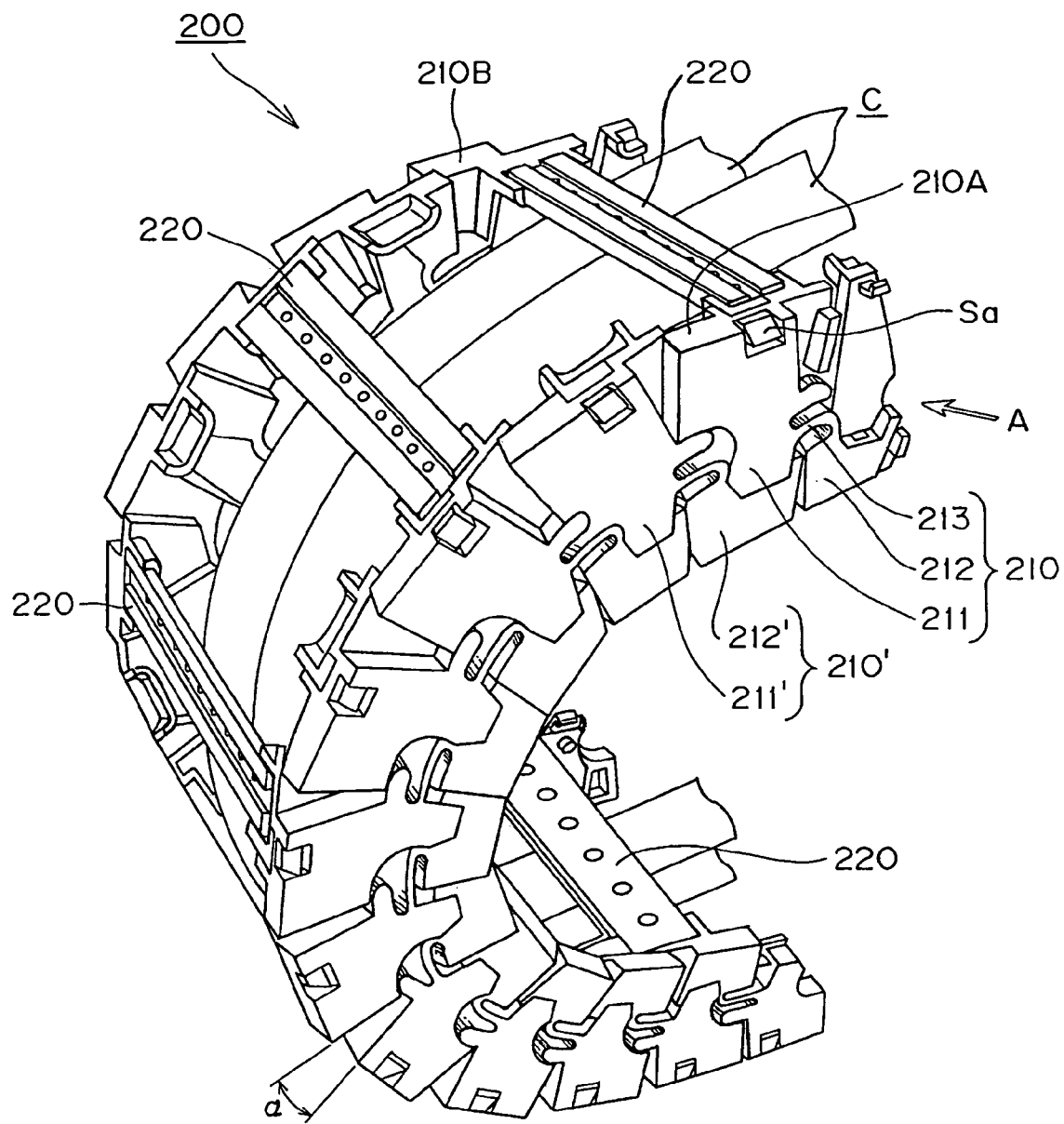
FIG. 3 is a perspective view showing a flexed state of a cable or the like protection and guide device, which is a second example according to the present invention.

It is noted that in FIG. 3, the above-mentioned movable portion and stationary portion are not shown.

Figure 4:
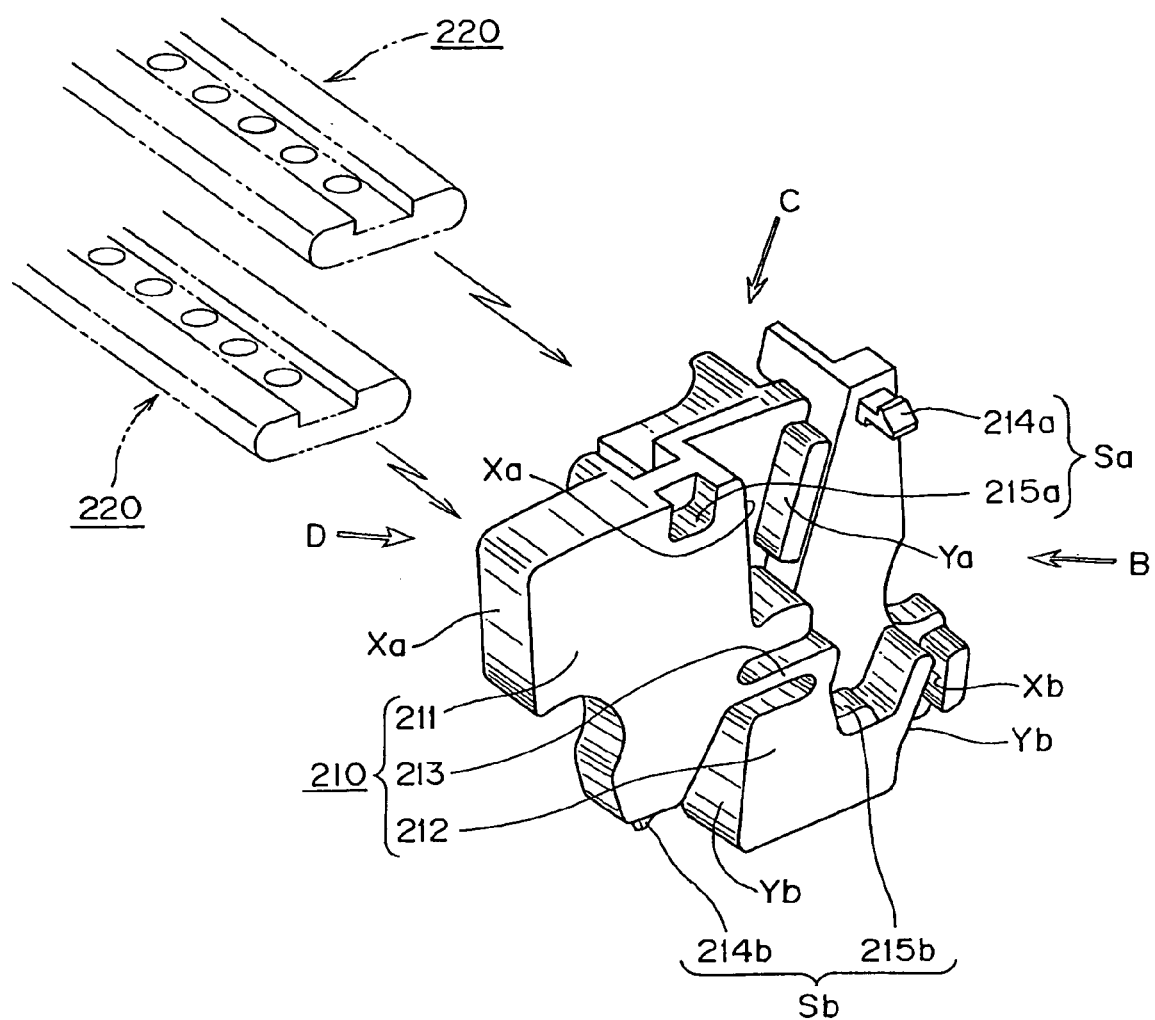
FIG. 4 is a perspective view of a side plate shown by an arrow A in FIG. 3.

And the side plates 210A used in the first example are, as shown in FIG. 4, molded using a polyamide resin and are symmetrical on the right and left sides by right and left pair of spaced arrangement. The side plate 210 is integrally formed as shown in FIG. 3 by a front side plate portion 211 connected to a precedent side plate 210', a rear side plate portion 212 connected to a subsequent side plate 210 and a flexible coupling portion 213 intervened between said front side plate portion 211 and said rear side plate portion 212.

Further, between the rear side plate portion 212' of the precedent side plate 210' and a front side plate portion 211 of a side plate 210 subsequently connected to the rear side plate portion 212' are respectively provided a flexion outer circumferential side snap-fit mechanism Sa and flexion inner circumferential side snap-fit mechanism Sb, respectively connected to each other. Then side plates 210, 210 which are adjacent through these snap-fit mechanisms Sa and Sb, are detachable from each other and maintenance during the decoupling and coupling of the side plates 210, 210 can be easily attained.

That is the snap-fit mechanisms Sa adopted on the flexion outer circumferential side in the second example is comprised of an engagement protrusion 214a consisting of an engagement hook 214a and a window-shaped hole 215a to be engaged, which is detachably engaged with this engagement protrusion 214a consisting of the engagement hook. On the other hand, the snap-fit mechanism Sb adopted on the flexion inner circumferential side is comprised of an engagement protrusion 214b consisting of an engagement protrusion pawl and a dimple-shaped hole 215b to be engaged, which is engaged with the engagement protrusion 214b consisting of the engagement protrusion pawl in an insertable manner Further, between an off set side surface of a front side plate portion 211 positioned on the flexion outer circumferential side than a coupling portion 213 of the side plate 210 and a front end of the front side plate portion 211' of the subsequent side plate 210' and between an off set side surface of a rear side plate portion 212 of the side plate 210 positioned on the flexion inner circumferential side than a coupling portion 213 of the side plate 210 and a front end of a rear side plate portion 212' of the subsequent side plate 210' are respectively provided two-sets of linear position holding surfaces, which hold the linear connecting state of the side plate 210, that is flexion outer circumferential side linear position holding surfaces Xa and flexion inner circumferential side linear position holding surfaces Xb.

Also, between an off set side surface of a rear side plate portion 212 positioned on the flexion inner circumferential side than a coupling portion 213 of the side plate 210 and a front end of the rear side plate portion 212' of the subsequent side plate 210' and between an off set side surface of a front side plate portion 211 positioned on the flexion outer circumferential side than a coupling portion 213 of the side plate 210 and an off set side surface of a rear side plate portion 212' of the subsequent side plate 210' are respectively provided two-sets of flexed position restriction surfaces, which restrict the flexed connecting state of the side plate 210, that is flexion inner circumferential side flexed position restriction surfaces Yb and flexion outer circumferential side flexed position restriction surfaces Ya.

As described above, in the cable or the like protection and guide device 200 of the second example, while the flexion inner circumferential side flexed position restriction surfaces Yb and the flexion outer circumferential side flexed position restriction surfaces Ya are respectively opened during linear position holding as shown in FIG. 3, the flexion outer circumferential side linear position holding surfaces Xa and the flexion inner circumferential side linear position holding surfaces Xb are respectively brought into contact with each other so that a linear position can be reliably maintained without applying a load to the coupling portion 213. Further, while the flexion outer circumferential side linear position holding surfaces Xa and the flexion inner circumferential side linear position holding surfaces Xb are respectively opened during flexed position restriction as shown in FIG. 3, the flexion inner circumferential side flexed position restriction surfaces Yb and the flexion outer circumferential side flexed position restriction surfaces Ya are respectively brought into contact with each other so that a flexed position can be reliably maintained without applying a load to the coupling portion 213.

It is noted that the maximum opening angles α between the flexion inner circumferential side flexed position restriction surfaces Yb and between the flexion outer circumferential side flexed position restriction surfaces Yb in the second example can be determined in accordance with the number of the side plates 210 continuously forming a flexed position and the flexional radius.

Therefore, the cable or the like protection and guide device 200 of the second example can reduce a load of manufacturing parts and a load of an assembly operation without increasing a parts count, and can avoid an inadvertent disconnection at the coupling portion 213, which is liable to occur due to repetition of flexing movements. Further, since adjacent side plates 210, 210 becomes detachable through two-sets of snap-fit mechanisms Sa and Sb respectively provided on the flexion outer circumferential side and the flexion inner circumferential side, the device 200 easily can attain maintenance during decoupling and coupling of the side plates 110, 110, and avoids a load, which is liable to occur at a coupling portion 113, which becomes a flexed portion during flexed position restriction so that excellent endurance can be exhibited. Further, since a surface contact load of the side plate, which occurs during the flexed position restriction and linear position holding is divided into two sides that are the flexion outer circumferential side and the flexion inner circumferential side, the device 100 endurably reliably can maintain the linear connection state and flexed connection state.

EXAMPLE 3

Figure 9:
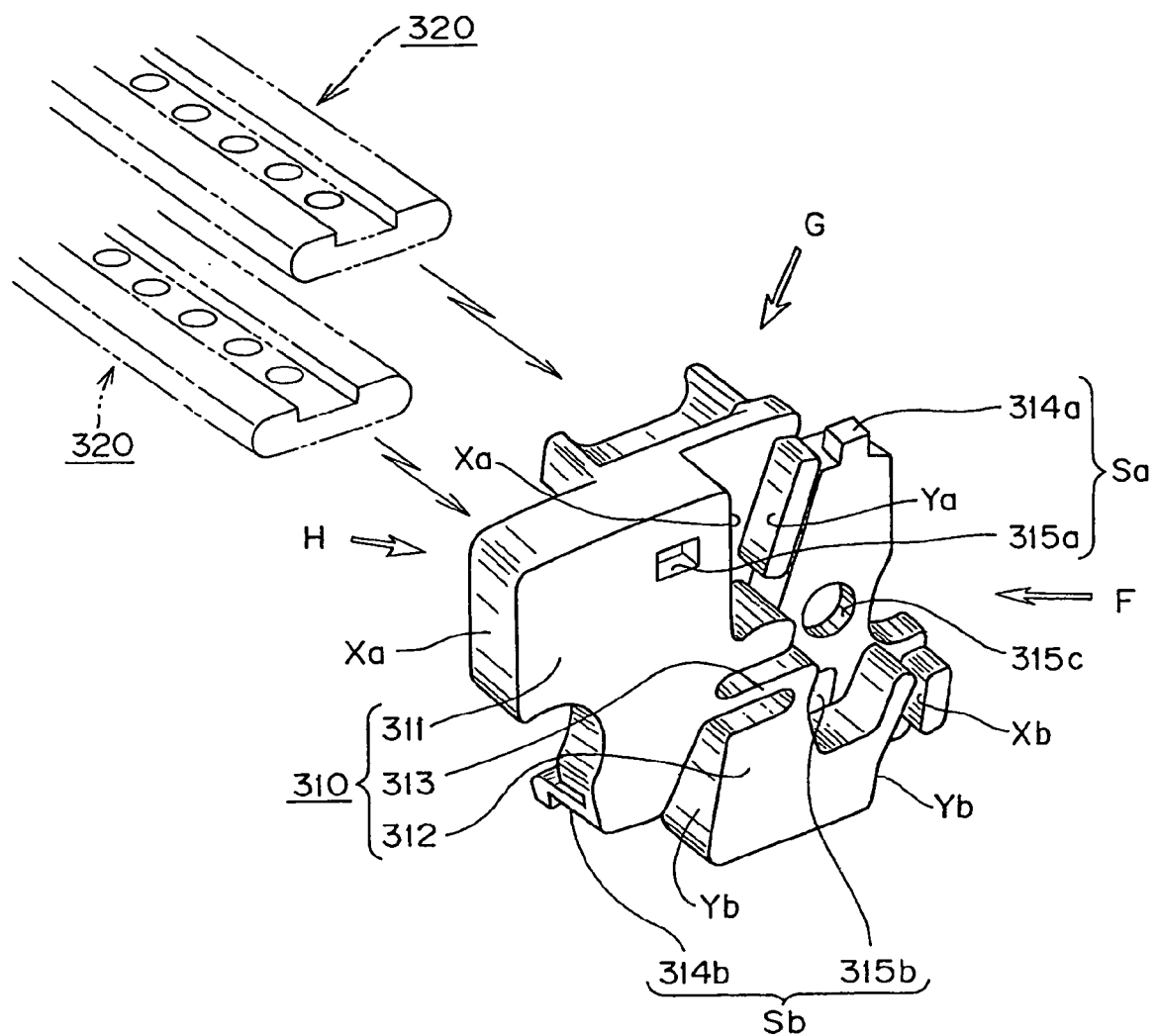
FIG. 9 is a perspective view of a side plate shown by an arrow E in FIG. 8.
Figure 10:
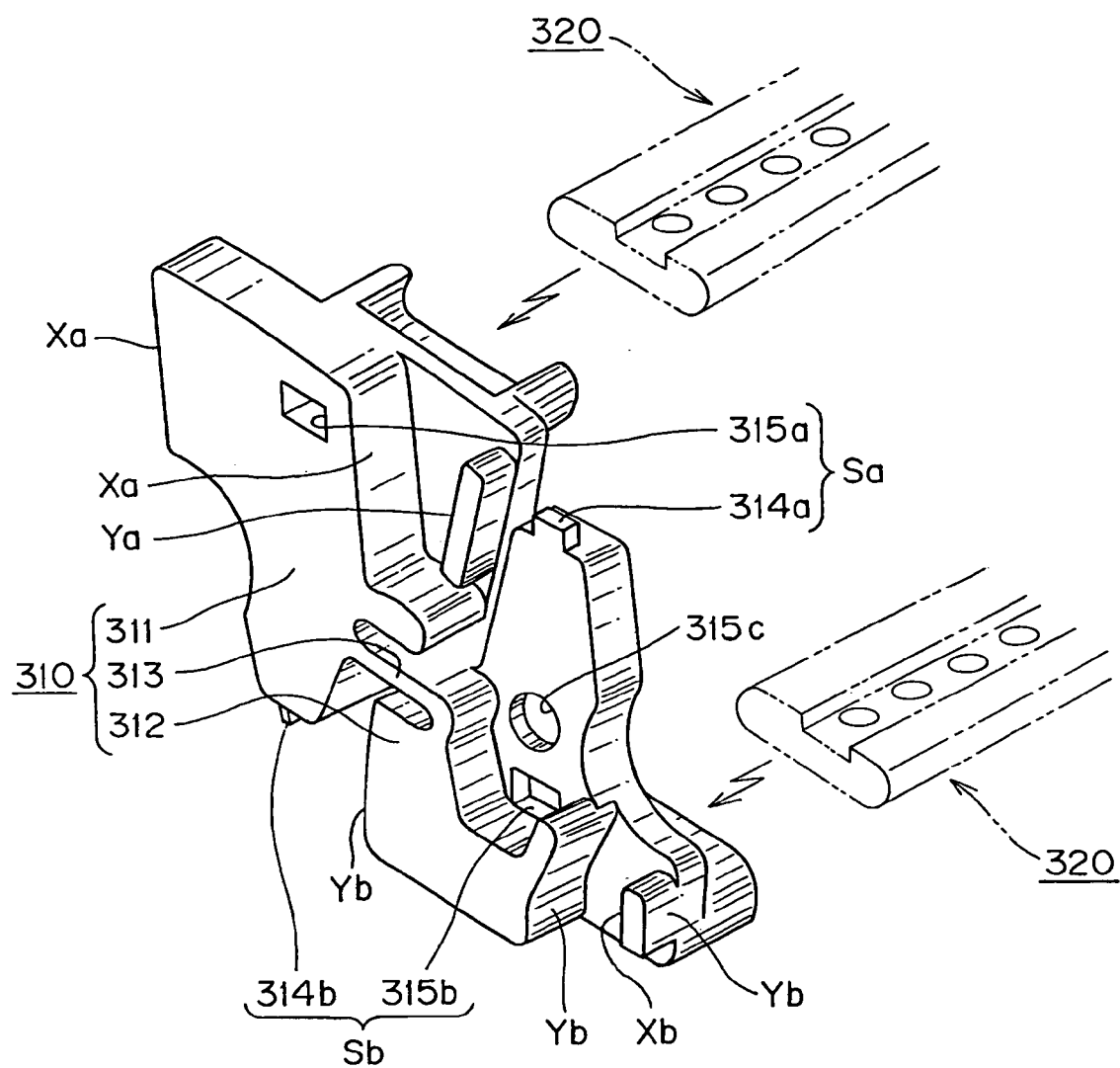
FIG. 10 is a perspective view of the side plate viewed from a direction F in FIG. 9.
Figure 11:
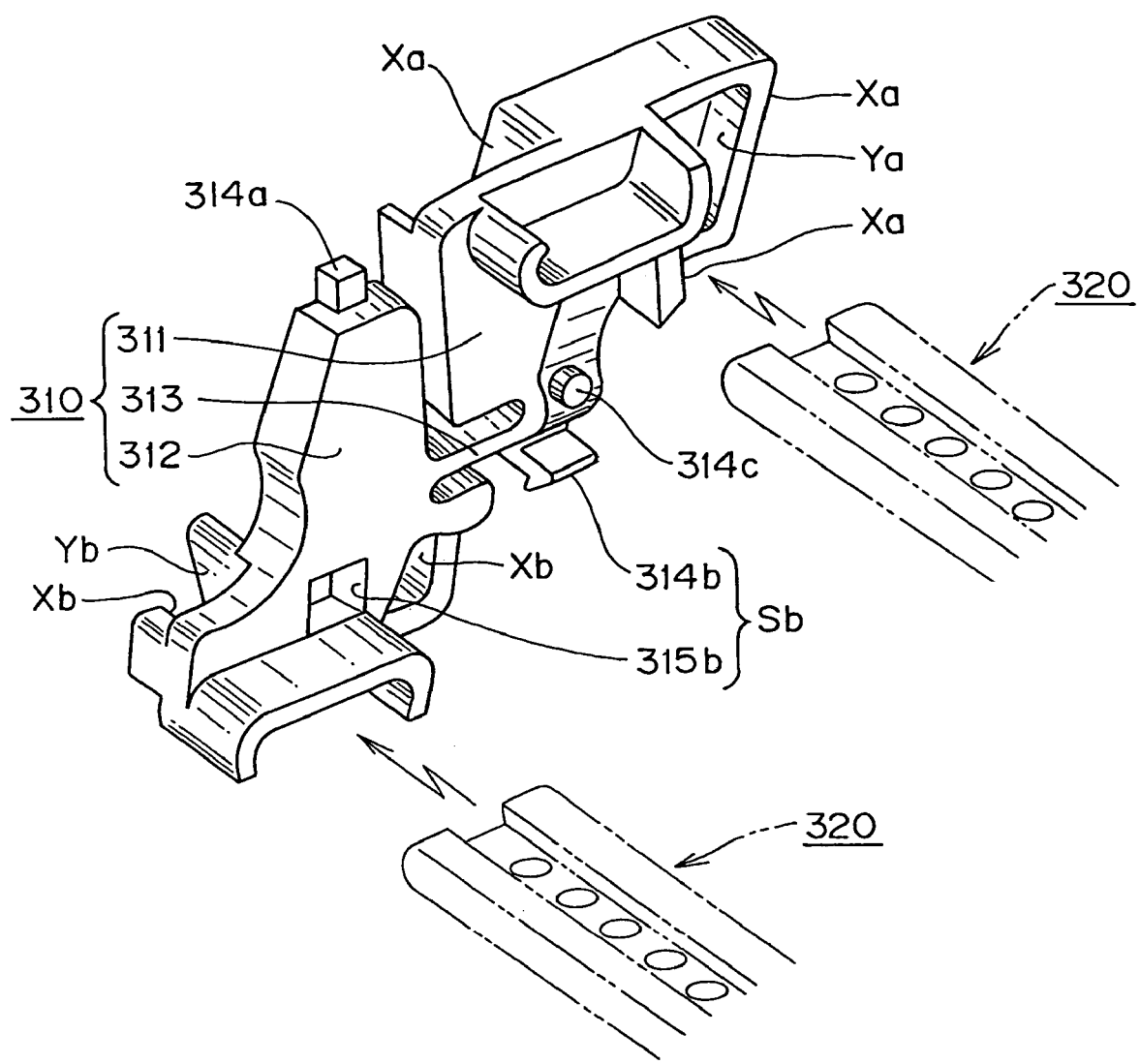
FIG. 11 is a perspective view of the side plate viewed from a direction G in FIG. 9.
Figure 12:
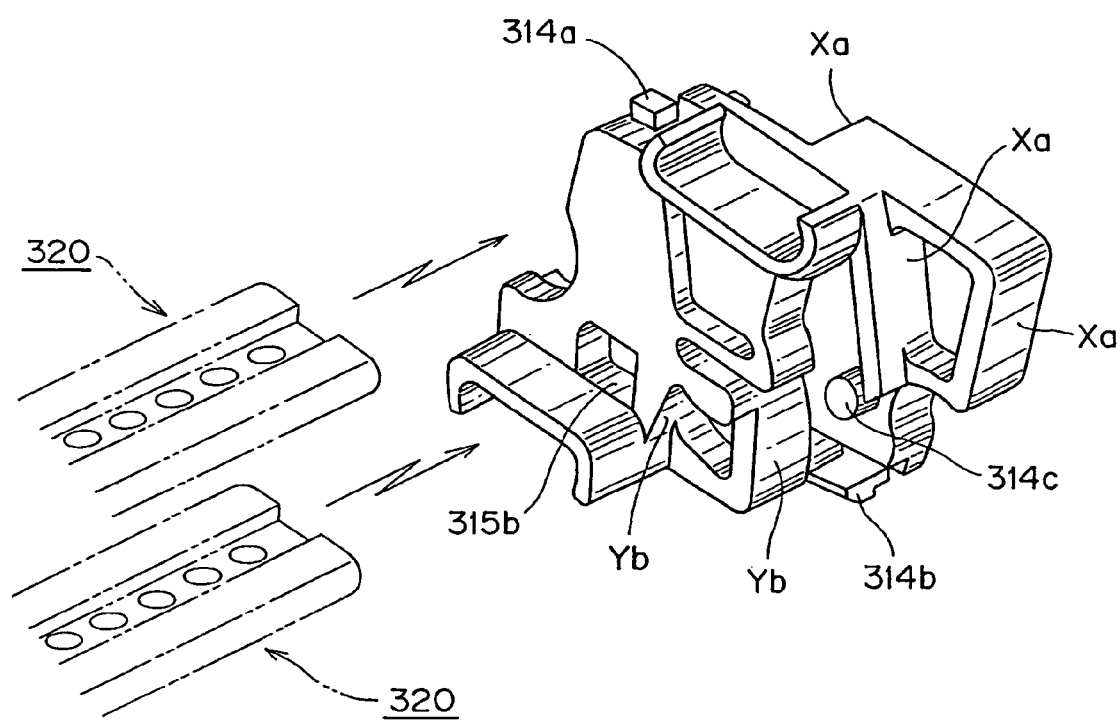
FIG. 12 is a perspective view of the side plate viewed from a direction H in FIG. 9.

A cable or the like protection and guide device 300, which is a third example of the present invention, will be described below with reference to FIGS. 8 to 12. Here, FIG. 8 is a perspective view showing a flexed state of the cable or the like protection and guide device 300, FIGS. 9 to 12 are perspective views of a side plate used in the cable or the like protection and guide device 300, and particularly FIG. 9 is a perspective view of the side plate shown by an arrow E in FIG. 8, FIG. 10 is a perspective view of the side plate viewed from a direction F in FIG. 9, FIG. 11 is a perspective view of the side plate viewed from a direction G in FIG. 9 and FIG. 12 is a perspective view of the side plate viewed from a direction H in FIG. 9.

The cable or the like protection and guide device 300, which is a third example of the present invention, is used, as in the above-mentioned cable or the like protection and guide device 200 of the first example, for protecting and guiding cables or the like C such as electric cables, which connect between a movable portion and a stationary portion in a semiconductor device, an explosive charge testing device, a door opening/closing device for a vehicle or the like to carry out transmission and supply of electric signals, and hoses, which supply pressure liquid or pressure gas, and is longitudinally connected to connect between the movable portion and the stationary portion (not shown), and further the device 300 can exhibit a linear position or a flexed position in accordance with relatively remote movement conditions between the movable portion and the stationary portion. As shown in FIG. 8, the cable or the like protection and guide device 300 is formed in such a manner that a number of right and left pair of spaced side plates 310A, 310B are connected to each other in a longitudinal direction and connecting arms 320 are bridged over flexion inner circumferential sides and flexion outer circumferential sides of these side plates 310A, 310B in alternate arrangement intervals of the side plates 310A, 310B, so that a cable (cables) or the like C is accommodated in a cable accommodating space with a rectangular section along the longitudinal direction, formed by being surrounded by these right and left pair of side plates 310A, 310B and these connecting arms 320, 320 arranged in a bridged manner over the flexion inner circumferential side and the flexion outer circumferential side, respectively.

Figure 8:
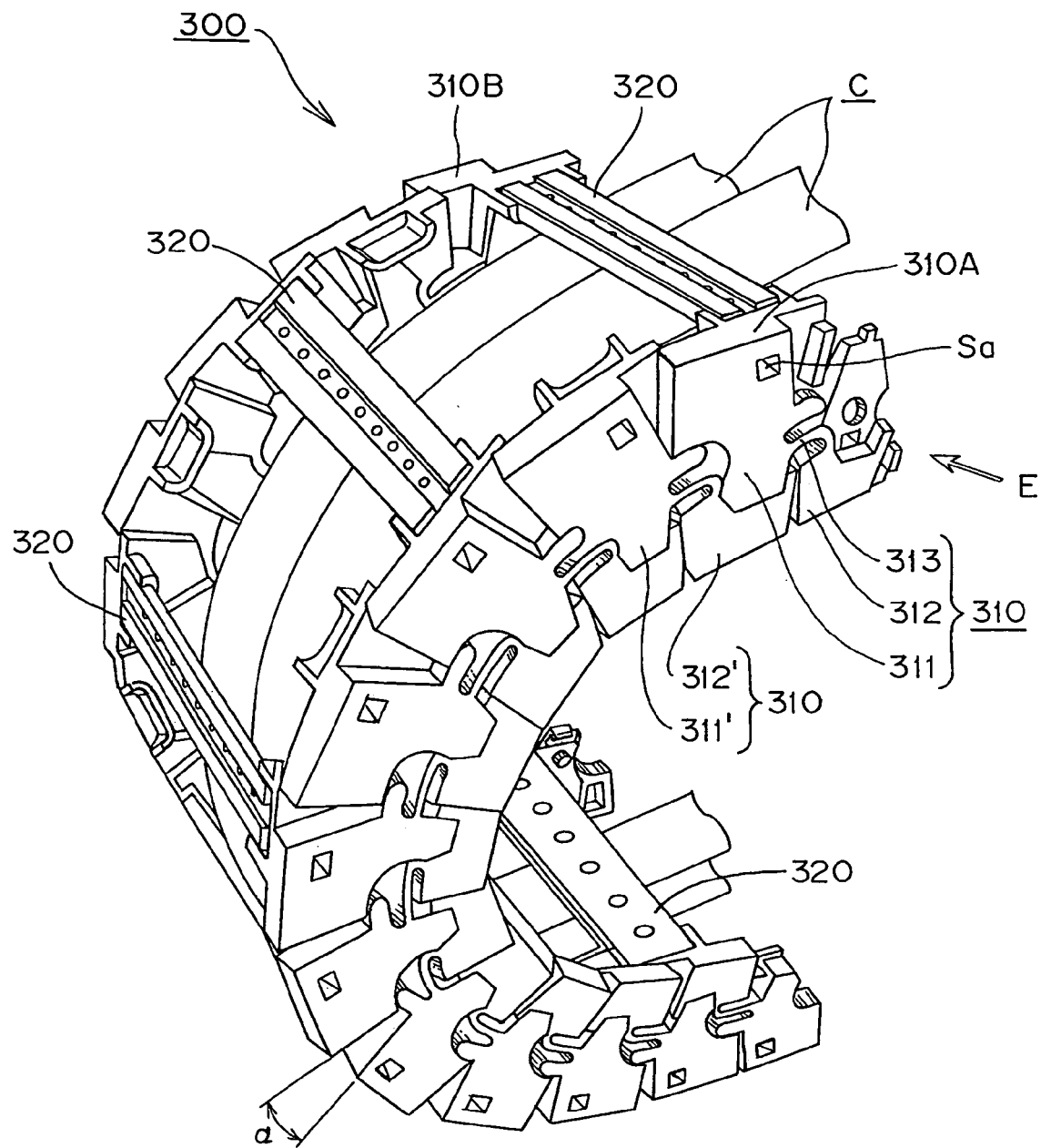
FIG. 8 is a perspective view showing a flexed state of a cable or the like protection and guide device, which is a third example according to the present invention.

It is noted that in FIG. 8, the above-mentioned movable portion and stationary portion are not shown.

And the side plates 310A, 310B used in the first example are molded using a polyamide resin and are symmetrical on the right and left sides. The side plate 310 is integrally formed as shown in FIG. 8 by a front side plate portion 311 connected to a precedent side plate 310', a rear side plate portion 312 connected to a subsequent side plate 310 and a flexible coupling portion 313 intervened between said front side plate portion 311 and said rear side plate portion 312.

And between the rear side plate portion 312' of the precedent side plate 310' and a front side plate portion 311 of a side plate 310 subsequently connected to the rear side plate portion 312' are respectively provided a flexion outer circumferential side snap-fit mechanism Sa and flexion inner circumferential side snap-fit mechanism Sb, respectively connected to each other, and snap-fit mechanism Sc adopted in the vicinity of the coupling portion 313. Then side plates 310, 310 which are adjacent through these snap-fit mechanisms Sa, Sb, Sc are detachable from each other and maintenance during the decoupling and coupling of the side plates 310, 310 can be easily attained.

That is the snap-fit mechanisms Sa adopted on the flexion outer circumferential side in the third example is comprised of an engagement protrusion 314a consisting of an engagement hook 314a and a window-shaped hole 315a to be engaged, which is detachably engaged with this engagement protrusion 314b consisting of the engagement hook. On the other hand, the snap-fit mechanism Sb adopted on the flexion inner circumferential side is comprised of an engagement protrusion 314b consisting of an engagement hook and a window-shaped hole 315b to be engaged, which is detachably engaged with the engagement protrusion 314b consisting of the engagement hook. And the snap-fit mechanism Sc adopted in the vicinity of the coupling portion 313 of the side plate 310, is comprised of an engagement protrusion 314c consisting of a cylindrical engagement pin and a window-shaped hole 315c to be engaged, which is detachably engaged with the engagement protrusion 314c consisting of the engagement pin.

Further, between an off set side surface of a front side plate portion 311 positioned on the flexion outer circumferential side than a coupling portion 313 of the side plate 310 and a front end of the front side plate portion 311' of the subsequent side plate 310' and between an off set side surface of a rear side plate portion 312 of the side plate 310 positioned on the flexion inner circumferential side than a coupling portion 313 of the side plate 310 and a front end of a rear side plate portion 312' of the subsequent side plate 310' are respectively provided two-sets of linear position holding surfaces, which hold the linear connecting state of the side plate 310, that is flexion outer circumferential side linear position holding surfaces Xa and flexion inner circumferential side linear position holding surfaces Xb.

Also, between an off set side surface of a rear side plate portion 312 positioned on the flexion inner circumferential side than a coupling portion 313 of the side plate 310 and a front end of the rear side plate portion 312' of the subsequent side plate 310' and between an off set side surface of a front side plate portion 311 positioned on the flexion outer circumferential side than a coupling portion 313 of the side plate 310 and an off set side surface of a rear side plate portion 312' of the subsequent side plate 310' are respectively provided two-sets of flexed position restriction surfaces, which restrict the flexed connecting state of the side plate 310, that is flexion inner circumferential side flexed position restriction surfaces Yb and flexion outer circumferential side flexed position restriction surfaces Ya.

As described above, in the cable or the like protection and guide device 300 of the second example, while the flexion inner circumferential side flexed position restriction surfaces Yb and the flexion outer circumferential side flexed position restriction surfaces Ya are respectively opened during linear position holding as shown in FIG. 8, the flexion outer circumferential side linear position holding surfaces Xa and the flexion inner circumferential side linear position holding surfaces Xb are respectively brought into contact with each other so that a linear position can be reliably maintained without applying a load to the coupling portion 313. Further, while the flexion outer circumferential side linear position holding surfaces Xa and the flexion inner circumferential side linear position holding surfaces Xb are respectively opened during flexed position restriction as shown in FIG. 8, the flexion inner circumferential side flexed position restriction surfaces Yb and the flexion outer circumferential side flexed position restriction surfaces Ya are respectively brought into contact with each other so that a flexed position can be reliably maintained without applying a load to the coupling portion 313.

It is noted that the maximum opening angles α between the flexion inner circumferential side flexed position restriction surfaces Yb and between the flexion outer circumferential side flexed position restriction surfaces Yb in the second example can be determined in accordance with the number of the side plates 310 continuously forming a flexed position and the flexional radius.

Therefore, the cable or the like protection and guide device 300 of the second example can reduce a load of manufacturing parts and a load of an assembly operation without increasing a parts count, and can avoid an inadvertent disconnection at the coupling portion 313, which is liable to occur due to repetition of flexing movements. Further, since adjacent side plates 310, 310 becomes detachable through two-sets of snap-fit mechanisms Sa and Sb respectively provided on the flexion outer circumferential side and the flexion inner circumferential side, the device 300 easily can attain maintenance during decoupling and coupling of the side plates 310, 310, and avoids a load, which is liable to occur at a coupling portion 313, which becomes a flexed portion during flexed position restriction so that excellent endurance can be exhibited. Further, since a surface contact load of the side plate, which occurs during the flexed position restriction and linear position holding is divided into two sides that is the flexion outer circumferential side and the flexion inner circumferential side, the device 300 endurably reliably can maintain the linear connection state and flexed connection state.

DESCRIPTION OF REFERENCE NUMERALS 100, 200, 300 . . . Cable or the like protection and guide device
110, 210, 310 . . . Side plate
111, 211, 311 . . . Front side plate portion
112, 212, 312 . . . Rear side plate portion
113, 213, 313 . . . Coupling portion
114a, 214a, 314a . . . Flexion outer circumferential side engagement protrusion
114b, 214b, 314b . . . Flexion inner circumferential side engagement protrusion
115a, 215a, 315a . . . Flexion outer circumferential side hole to be engaged
115b, 215b, 315b . . . Flexion inner circumferential side hole to be engaged
314c . . . Engagement protrusion
315c . . . Hole to be engaged
120, 220, 320 . . . Connection arm
Sa, Sb, Sc . . . Snap-fit mechanism
Xa . . . Flexion outer circumferential side linear position holding surface
Ya . . . Flexion outer circumferential side flexed position restriction surface
Xb . . . Flexion inner circumferential side linear position holding surface
Yb . . . Flexion inner circumferential side flexed position restriction surface
C . . . Cable (Cables) or the like
α . . . Maximum opening angle between flexed position restriction surfaces While the invention has been described herein by way of example those skilled in the art will readily recognize that changes and modifications may be made to the invention without departing from the spirit and scope of the appended claims.

The invention claimed is:

1. A cable protection and guide device in which a number of right and left pairs of spaced side plates are connected to each other in a longitudinal direction and connecting arms are bridged over flexion inner circumferential sides and flexion outer circumferential sides of each of said side plates in predetermined intervals, so that a cable is accommodated in a cable accommodating space along the longitudinal direction, said cable being surrounded by each of said side plates and said connecting arms, characterized in that each of said side plates is integrally formed by and includes a front side plate portion connected to a precedent side plate, a rear side plate portion connected to a subsequent side plate and a flexible coupling portion intervened between said front side plate portion and said rear side plate portion, and each of said side plates includes a snap-fit mechanism, which connects said side plates to each other is provided between a rear side plate portion of the precedent side plate and a front side plate portion of a side plate subsequently connected to said rear side plate portion.

2. A cable protection and guide device according to claim 1, characterized in that a linear position holding surface, which holds a linear connection state of each of said side plates, is formed on a flexion outer circumferential side portion of each of said side plates; and a flexed position restricting surface, which restricts the flexed connection state of each of said side plates, is formed on a flexion inner circumferential side portion of each of said side plates.

3. A cable protection and guide device according to claim 1, characterized in that each of said side plates includes a linear position holding surfaces which hold a linear connection state of each of said side plates formed on a flexion outer circumferential side portion of said front side plate portion and on a flexion inner circumferential side portion of said rear side plate portion, and a flexed position restricting surfaces which restrict the flexed connection state of each of said side plates formed on a flexion outer circumferential side portion of said front side plate portion and on a flexion inner circumferential side portion of said rear side plate portion.

4. A cable protection and guide device in which a number of right and left pairs of spaced side plates are connected to adjacent side plates in a longitudinal direction and connecting arms are bridged over flexion inner circumferential sides and flexion outer circumferential sides of each of said side plates in predetermined intervals, so that a cable is accommodated in a cable accommodating space along said longitudinal direction, said cable being surrounded by each of said side plates and said connecting arms, characterized in that each of said side plates includes a front side plate portion which terminates in a precedent side plate, a rear side plate portion which terminates in a subsequent side plate and a flexible coupling portion interposed between said front side plate portion and said rear side plate portion, and each of said side plates includes a snap-fit mechanism and a first opening, said snap-fit mechanism includes an engagement protrusion extending from said subsequent rear side plate portion, said first opening residing in said front side plate portion, said engagement protrusion of said subsequent side plate of said rear side plate portion engages said first opening of said precedent side plate of said front side plate portion of the next adjacent side plate, each said engagement protrusion has an edge, each said front side plate portions of each said side plate includes a second opening which intersects said first opening, and, said edge of said engagement protrusion extending from said subsequent rear side plate portions interengages said second opening of said front side plate portions of said side plate locking said adjacent plates together.

\* \* \* \* \*

UNITED STATES PATENT AND TRADEMARK OFFICE
CERTIFICATE OF CORRECTION

PATENT NO. : 7,204,075 B2
APPLICATION NO. : 11/271551
DATED : April 17, 2007
INVENTOR(S) : Akihiko Utaki It is certified that error appears in the above-identified patent and that said Letters Patent is hereby corrected as shown below:

COLUMN 8:
Line 12, after "plates" delete "21OA" and insert --210A--.

COLUMN 13:
Line 14, after "formed" delete "by".
Line 35, after "includes" delete "a".
Line 40, after "and" delete "a".

Signed and Sealed this

Twelfth Day of June, 2007

JON W. DUDAS
*Director of the United States Patent and Trademark Office*